(12) United States Patent
Alonzo et al.

(10) Patent No.: US 7,945,490 B2
(45) Date of Patent: May 17, 2011

(54) PROVIDING AGGREGATE FORECASTED IMPACT INFORMATION FOR PHYSICAL TO FINANCIAL ASSET RECONCILIATION

(75) Inventors: Jason Aron Alonzo, Fair Oaks, CA (US); Ann Scullion, Livermore, CA (US); John Leong Yee, San Mateo, CA (US); Umesh Madhav Apte, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 903 days.

(21) Appl. No.: 11/847,723

(22) Filed: Aug. 30, 2007

(65) Prior Publication Data

US 2009/0063310 A1 Mar. 5, 2009

(51) Int. Cl.
*G06Q 40/00* (2006.01)
(52) U.S. Cl. .......................... 705/30; 705/35; 705/36 R
(58) Field of Classification Search .................... 705/30
See application file for complete search history.

(56) References Cited

U.S. PATENT DOCUMENTS

| 7,617,270 | B2 * | 11/2009 | Nikitin | 708/801 |
|---|---|---|---|---|
| 2004/0230507 | A1 * | 11/2004 | Davidovitch et al. | 705/35 |
| 2006/0129415 | A1 * | 6/2006 | Thukral et al. | 705/1 |
| 2007/0244777 | A1 * | 10/2007 | Torre et al. | 705/35 |
| 2008/0208897 | A1 * | 8/2008 | Lew et al. | 707/103 R |

* cited by examiner

*Primary Examiner* — Jagdish N Patel
*Assistant Examiner* — Kevin Poe
(74) *Attorney, Agent, or Firm* — Kilpatrick Townsend & Stockton LLP (57) ABSTRACT

A reconciliation process identifying financial assets in a financial system that do not also exist in the real world, such as is indicated in a discovery system, generates a list of exceptions that can be examined by type of exception. The list of exceptions also includes aggregate financial impact information for the exceptions, such as aggregate cost, fair market value, and net book value. An interface allows a user to view the financial impact information and better decide how to handle the assets corresponding to the exceptions, such as by retiring at least some of the assets, routing some of the exceptions to another user better able to handle the exceptions, or storing the list so that an investigation can be done into at least some of the assets. The financial impact information becomes particularly critical near quarter-end and year-end, as any material impact to the books requires timely disclosure.

30 Claims, 9 Drawing Sheets

FIG. 1

Inventory Exceptions — 200

Amount in 1000's          Currency: USD   Rate Type: CRRNT

| Business Rule | Exceptions | NBV | Cost | FMV |
|---|---|---|---|---|
| Custodian Differ | 30 | | | |
| Custodian DeptID Differ | 33 | | | |
| Unauthorized Software | 68 | | | |
| Asset not in ARM | 21 | | | |
| Asset not in Discovery | 70 | 25.707 | 113.498 | 21.503 |
| Location Differ | 1 | | | |
| Manufacturer Differ | 10 | | | |
| Model Differ | 18 | | | |

Last Updated: 07/05/06 3:09:59PM 202, 204, 206, 208

FIG. 2

| Field | Op | Value |
|---|---|---|
| Financial List | = | |
| Business Rule | = | Serial ID-ARM |
| Financial Impact | = | Yes |
| Financial Status | = | |
| Serial Number | = | |
| Asset ID | = | |
| Business Unit HR | = | |
| Business Unit AM | = | |
| Manufacturer ID Discovery | = | |
| Manufacturer ID ARM | = | |
| Model Discovery | = | |
| Model ARM | = | |
| Custodian Discovery | = | |
| Custodian ARM | = | |
| Department Discovery | = | |
| Department ARM | = | |

Search   Clear 300, 302, 304, 306

| | Select | | Serial Number Discovery | Serial Number ARM | Manufacturer Discovery | Manufacturer ARM | Model Discovery | Model ARM | Log |
|---|---|---|---|---|---|---|---|---|---|
| 1 | ☑ | ⚠ | | 000000000001 | | | | | |
| 2 | ☐ | ⚠ | | 109RMP2AY | | TOSHIBA CORPORATION | | TECRA M1 | |
| 3 | ☐ | ⚠ | | 1107124003 | | | | | |
| 4 | ☐ | ⚠ | | 22770PUQDU | | TOSHIBA CORPORATION | | PORTEGE 2000 | |
| 5 | ☑ | ⚠ | | 2400MM2SV | | TOSHIBA CORPORATION | | TOSHIBA Portege 2010 | |
| 6 | ☑ | ⚠ | | 3027PK9UT | | TOSHIBA CORPORATION | | | |
| 7 | ☑ | ⚠ | | 40410AWQH | | TOSHIBA CORPORATION | | EQUIUM 7100D | |
| 8 | ☑ | ⚠ | | 41954UVRG | | IBM | | IBM 23738U0 | |
| 9 | ☑ | ⚠ | | 50055USUD | | TOSHIBA CORPORATION | | TECRA 8100 | |
| 10 | ☑ | ⚠ | | 5013B2UJKN | | DELL | | GXL620 | |

FIG. 5

▼ Financial Impact

| Total NBV Selected | 2839.630 |
|---|---|
| Total Cost Selected | 12999.000 |
| Total FMV Selected | 3213.000 |
| Currency Code | USD |
| Rate Type | SPOT |
| Financial List | Q407 |
| Description | Retirments Fiscal Q4 2007 |

Update Totals | Save | Notify Finance | Archive

502

Review Action Errors

Notify Finance

Recipient

To  peoplesoft@peoplesoft.com

Add all role users

Subject  A financial impact list awaits your attention.

Message  The financial impact list, Q407, created in Manage Exceptions awaits your attention. You can access the list through either link below. The first list will take you to Manage Exceptions, the second to Financial List inquiry.
http://adas0173.peoplesoft.com:6200/psp/EM_AM900DVB_TS110839_2/EMPLOYEE/ERP/c/MANAGE_IT_ASSETS.IT_EXCPT_SEL.GBL?Action=U&LIST_ID=Q407
http://adas0173.peoplesoft.com:6200/psp/EM_AM900DVB_TS110839_2/EMPLOYE Send   Cancel

FIG. 6    600

Manage Exceptions

Search

Use Saved Search

Save Search Criteria   Delete Saved Search

Financial List   =   Q407
Business Rule    =
Financial Impact =

FIG. 7    700

Financial List Inquiry                                800

Financial List:  Q407              Description     Retirments Fiscal Q4 2007
ITAM Source   Manage Exceptions   Created By      DVP1
Last Saved By  DVP1               Last Updated By
Last Saved     08/09/07 4:20PM    Last Update Select All  Clear All

| Select | Serial ID | Business Unit | Asset Identification | Net Book Value | Cost | Fair Market Value | Routed | Action | Log |
|---|---|---|---|---|---|---|---|---|---|
| 1 ☐ | 000000000001 | US001 | 000000000001 | | | | | Retire | |
| 2 ☐ | 2400MM2SV | US001 | ITZ014 | 574.940 | 2775.000 | 700.000 | | Retire | |
| 3 ☐ | 3027PK9UT | US001 | ITZ008 | 574.940 | 2775.000 | 750.000 | | Retire | |
| 4 ☐ | 40410AWQH | US001 | ITZ034 | 327.540 | 1444.000 | 400.000 | | Retire | |
| 5 ☐ | 41954UVRG | US001 | ITZ077 | 487.720 | 2150.000 | 445.000 | | Retire | |
| 6 ☐ | 50055USUD | US001 | ITZ043 | 521.770 | 2300.000 | 618.000 | | Retire | |
| 7 ☐ | 5013B2UJKN | US001 | ITZ053 | 352.720 | 1555.000 | 300.000 | | Retire | |

Select All  Clear All

Retire Assets | Other Options | By Chartfield

Unit: US001   Asset ID: ITZ014   TOSHIBA Portege 2010   Tag:   In Service
Trans Date:    Acctg Date:    Rate Type:

Book   Find | View All   First ◀ 1 of 2 ▶ Last

902 — Book Name: CORP   Corporate   Base Currency: USD   As Of: 08/09/2007
Retire As: Missing Asset [Go]   Quantity: 1.0000
☑ Copy Changes to Other Books   Cost: 2,775.00

Retirement   Find | View All   First ◀ 1 of 1 ▶ Last

*Disposal Code:         Date/Time: 08/09/07 4:31:40PM   Ret Status: Unretired
Quantity:           Retirement Amt:            USD
Removal Cost:       RC Curr:    Base Removal Cost:   0.00
Proceeds:           Pr Curr:    Base Proceeds:       0.00
Convention: Actual Month       Accum Depr:          0.00
Trans Code:         Gain/Loss:                       0.00
Retire Option:

Return to Financial Impact

[Save] [Return to Search] [Notify]

Retire Assets | Other Options | By Chartfield

FIG. 10

| | Select | Serial ID | Business Unit | Asset Identification | Net Book Value | Cost | Fair |
|---|---|---|---|---|---|---|---|
| 1 | ☐ | 000000000001 | US001 | 000000000001 | | | |
| 2 | ☐ | 2400MM2SV | US001 | ITZ014 | 574.940 | 2775.000 | |
| 3 | ☑ | 3027PK9UT | US001 | ITZ008 | 574.940 | 2775.000 | |
| 4 | ☑ | 40410AWQH | US001 | ITZ034 | 327.540 | 1444.000 | |
| 5 | ☑ | 41954UVRG | US001 | ITZ077 | 487.720 | 2150.000 | |
| 6 | ☐ | 50055USUD | US001 | ITZ043 | 521.770 | 2300.000 | |
| 7 | ☐ | 5013B2UJKN | US001 | ITZ053 | 352.720 | 1555.000 | |

☑ Select All   ☐ Clear All

Financial Impact

Total NBV Selected       1390.200
Total Cost Selected      6369.000
Total FMV Selected       1595.000
Currency Code      USD
Rate Type          SPOT
Financial List     Q407
Description        Retirments Fiscal Q4 2007

[Update Totals] [Save] [Send to worklist] [Archive]

1100

| Assets Not Reporting | | | | | | |
|---|---|---|---|---|---|---|
| Amount in 1000's | | Currency: USD | | Rate Type: SPOT | | |
| Inventory Age Seq | Inventory Age | SubType | Quantity | NBV | Cost | FMV |
| 1 | 3 weeks | Servers | 3 | 0.599 | 2.25 | 0 |
| 2 | 6 weeks | Desktop | 18 | 6.401 | 24.045 | 0.8 |
| 2 | 6 weeks | Servers | 3 | 0.599 | 2.25 | 0 |
| 3 | 9 weeks | All Devices | 58 | 26.27 | 102.658 | 6.35 |

Last Updated: 07/05/2006 3:09:14PM

PROVIDING AGGREGATE FORECASTED IMPACT INFORMATION FOR PHYSICAL TO FINANCIAL ASSET RECONCILIATION

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the management of assets, and more particularly to the reconciliation of physical and financial asset information and aggregate forecasting of information for reconciliation exceptions.

Large organizations often have trouble keeping track of their assets as the assets are purchased and deployed throughout the organization. Proper accounting and tracking of these assets is necessary to ensure compliance with arrangements such as leases and software licenses, and to ensure there are no material discrepancies between the physical existence of these assets and what is recorded on the financial set of books.

For example, physical assets such as laptop computers and portable electronic devices (which are often prone to loss or theft) are typically accounted for not only in physical inventory but also as financial assets of a company for accounting, auditing, and other financial purposes. Further complicating matters is the fact that organizations can be very large and thus can have large numbers of asset reconciliation exceptions across an enterprise. Often times an organization will rely on the information that is stored in a financial system to track and manage their assets; however this rarely reflects the real world of assets that are actually deployed within the organization. The financial information lacks the impact of events such as operational asset disposal, unrecorded sales, theft, etc.

Increasingly, organizations are deploying asset tracking (physical discovery) mechanisms that can retrieve the actual asset information as the asset is utilized in the organization. Organizations then take the information that comes from the physical discovery and reconcile that information back to the financial system. In one current approach, organizations utilize software packages from various "discovery" vendors. The discovery vendor software is typically installed on, or pushed onto, information technology (IT) devices such as servers, desktops, or laptops. The discovery software can then perform an inventory scan of devices across an enterprise and reports back device information which can include such data as the device manufacturer, model, serial number, etc. The discovery software also can report back on the various software installed and/or activated on the device. The reported data thus can be used to determine the number and type of each asset across the enterprise.

This data can then be used with a product such as PeopleSoft IT Asset Management (ITAM), available from Oracle Corporation of Redwood Shores, Calif., which integrates data from third party discovery vendors, where the vendor solutions discover and take inventory of intelligent IT devices connected to an organization's network. The information obtained includes details and/or attributes about each IT device, such as the manufacturer, model, machine name, installed software, and serial number. A physical count of the number of IT devices, for example, then can be compared with information stored in an asset repository containing financial asset information. Typically, this involves doing manual queries and then manually creating reports in spreadsheet applications in order to determine where discrepancies might exist between the physical asset information and the financial asset information. Further, determining financial impact information for these discrepancies is an even more arduous manual task.

Currently, there is no easy way to determine where such exceptions exist, forecast the aggregate financial impact of those exceptions, and allow the exceptions to be resolved such as by locating, updating, or retiring the asset(s).

BRIEF SUMMARY OF THE INVENTION

Systems and methods in accordance with various embodiments of the present invention provide for the ability to display the aggregate forecasted financial impact for groups of asset exceptions in order to better determine how to handle those exceptions. The systems and methods also allow a user to handle those exceptions directly, such as by retiring the corresponding assets in the financial system, or to route at least some of the exceptions and corresponding aggregate financial information to another user better able to determine how to handle the exceptions.

In one embodiment, a discovery process is run to determine the presence of intelligent devices across a network or enterprise, as well as other network-connected assets. This information is then stored in a discovery repository. A financial system (e.g., financial asset repository) also stores financial information for each asset added to the network or enterprise. Periodically, such as near quarter-end or year-end, an asset manager or finance manager runs a reconciliation process to determine the presence of exceptions between the physical asset information stored in the discovery system and the financial asset information stored in the financial asset repository.

In one embodiment, a financial/asset management application will generate a list of exceptions, which can include exceptions of varying types, and will calculate the aggregate financial impact information for at least some of those types. For example, the system might calculate cost, fair market value, and net book value information for any physical assets not reporting or otherwise found in the financial system but not the discovery system. The application then can display this exception and the associated aggregate financial impact to a user in order to better allow the user to determine how to handle the exceptions.

In one embodiment, the user is able to retire the assets, route the exceptions to another user, or store the list of exceptions for later retrieval while the existence or status of the physical assets is investigated. The aggregate impact information helps in this determination, as a user might handle the exceptions differently if the exceptions will have a material impact on the financial books than if the exceptions will have little to no impact.

In one embodiment, the user is able to partition the asset exceptions into groups, and then route, retire, or store each group as desired. When routing a group to another user, the system can generate and send a message including a link to the list of exceptions, whereby the second user can easily access and view the list or group of exceptions sent by the first user. If the first or second user determines that an asset is found or otherwise reconciles the physical and financial information for that asset, the user can remove that asset from the exception list.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments can overcome the aforementioned and other deficiencies in asset management and financial systems by changing the way in which discrepancies between physical and financial assets are handled. For example, a system in accordance with one embodiment provides an aggregate view of the financial impact of various discrepancies. The system runs a reconciliation process and identifies assets that reside in a financial asset repository of the system, for example, but do not show up as a physical asset in the real world, such as may be determined from a discovery portion of the system. A discrepancy might exist because a physical asset was lost or stolen, is not longer operational, or any other such reason. In such a case, where the physical asset corresponds to a capitalized asset, a decision needs to be made as to whether to retire or dispose of the asset from a financial perspective. By aggregating financial information and forecasting the financial impact on parameters such as cost, fair market value, and net book value, a CFO or other financial decision maker can better determine whether to retire or dispose of at least some of those assets or whether to expend the time and energy to attempt to locate at least some of those assets.

Such a system also provides a mechanism for partitioning or grouping this aggregate financial information and routing the information to the stakeholders of an asset or the stakeholder of the financial information associated with the asset. It is likely that the person managing the IT assets and determining whether the assets exist probably does not have the authority or expertise to determine, from a financial perspective, whether an asset should be retired. The person also might not know which triggers need to occur in order to actually perform the financial retirement. The grouping mechanism thus provides a way for a functional person in a physical environment to provide a finance person with aggregate information about the assets, along with the financial impact of each of those assets, as well as those assets in total.

An asset manager thus can review the discrepancies for capitalized assets that are no longer found by a physical asset discovery system and route the asset information to the finance organization for retirement in order to resolve the discovered discrepancy. The finance organization can benefit from knowing how many total assets are going to be recommended for retirement and, more importantly, the financial impact of the retirement of those assets. This information becomes particularly critical near quarter-end and year-end, as any material impact to the books requires timely disclosure.

Once a list of exceptions is created, the list can be routed to finance using any appropriate messaging or routing technology known or used in the art, such as by sending an email message that includes a link to the information. A finance manager (or other appropriate user) then can bring up the list of assets in an application that is tailored to the financial needs. The finance manager may not have access to all the other assets, and thus may not need to be secured against being able to do other types of transactions such as updating the asset repository. The finance manager might then simply receive a view of the specific assets at issue, and the manager might have role access to that particular view. Such an approach allows the finance manager to not need as much training, and to not have to be a "super user" or have a higher level of access. The finance manager can simply view the information that is important to the manager, which is this particular set of financial assets. From the asset list the financial manager can route those assets to other people in the finance department responsible for those assets. The finance manager also can put at least some of these assets into a worklist and route the worklist to the appropriate person(s). The finance manager may also work the list, using the financial forecast information to decide which assets to retire, and then route what is left to other finance employees, etc. Thus, there are many different avenues through which to handle the assets.

Figure 1:
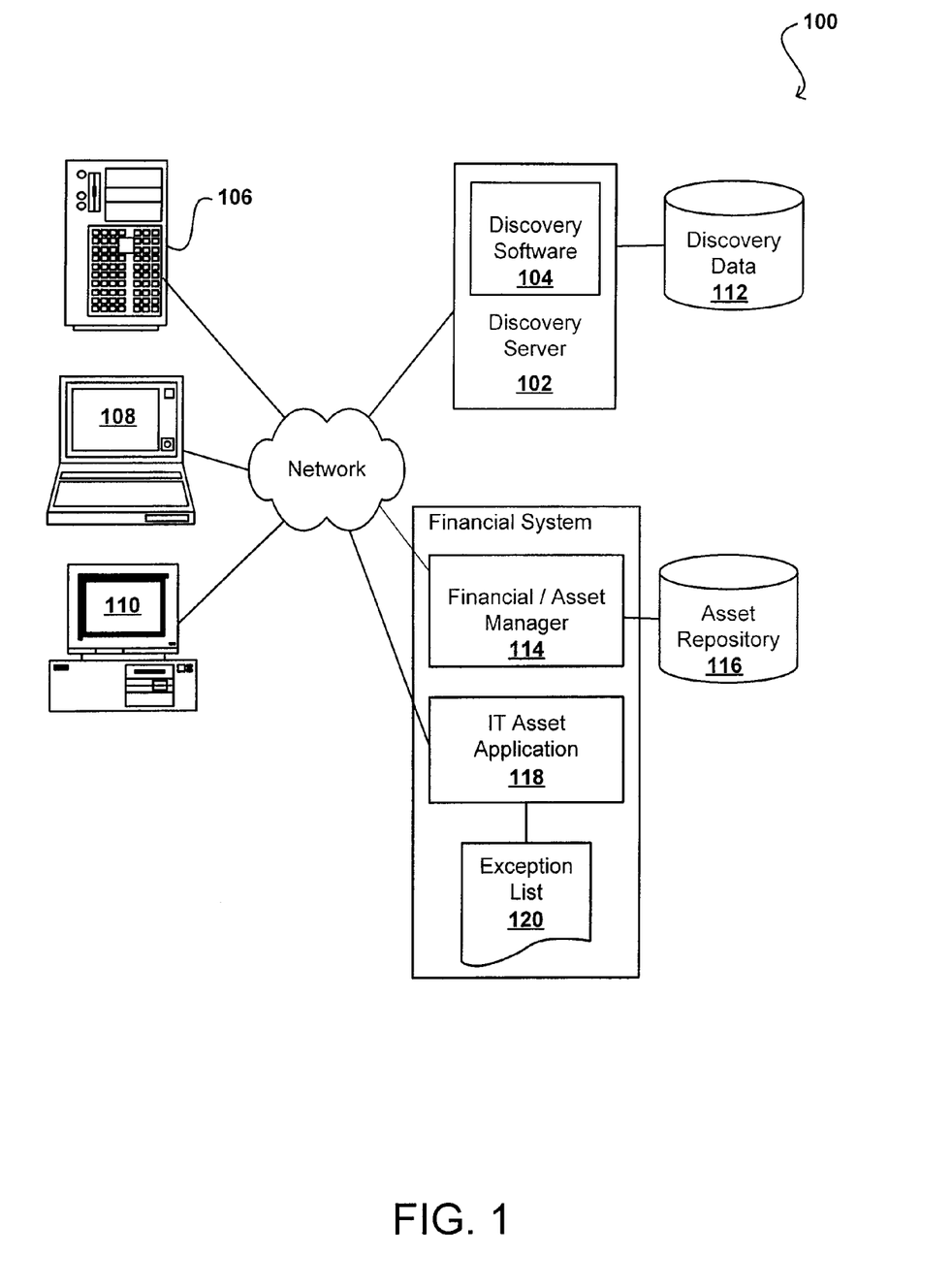
FIG. 1 illustrates a system that can be used for physical and financial asset reconciliation in accordance with one embodiment of the present invention.

FIG. 1 illustrates an exemplary configuration 100 that can be used for the discovery and reconciliation of physical and financial assets for a given entity. In this example, an instance of the discovery vendor software 104 is installed on a discovery server 102 or other device across the network for the entity. In some embodiments, the software may be installed remotely or may have at least one component installed on each device to be monitored. The discovery software 104 can communicate with each appropriate intelligent device, such as a server 106, laptop 108, or desktop 110, and can gather "discovery" information such as serial number, number of processors, installed software, etc. This discovery information then can be written to a discovery data store 112. A separate financial system device 114, from which asset data can be obtained, is used to gather financial asset information and store that information to an asset repository 116. Once the discovery and asset information is obtained, an IT asset management (ITAM) application 118 can query and analyze the data in the discovery data store 112 and asset repository 116 in order to reconcile the physical and financial assets. After doing the reconciliation, the ITAM application 118 can generate a list of exceptions 120, such as where assets were found in the financial system that do not exist in the discovery data. The list can take any appropriate form, such as a report or spreadsheet generated for review, or can include at least one message sent to a user or owner responsible for the exception.

The discovery software 104 does an inventory of intelligent devices across the entity network, within an entity domain, or using specified address ranges, to obtain inventory information for each such device. An example of such discovery software is the Altiris Network Discovery package presently available from Symantec Corporation of Cupertino, Calif. This information, relating to physical inventory for an entity, then can be compared with the financial books or information for the entity, stored in the asset repository 116 in this example. The financial information can be gathered and maintained by any appropriate product, such as PeopleSoft Enterprise IT Asset Management (ITAM) available from Oracle Corporation of Redwood Shores, Calif. A data store for a product such as ITAM typically revolves around the asset management tables or solution, and provides information such as the net book value of an IT asset given depreciation, etc.

In one embodiment, an asset manager creates a 'financial list' of capitalized assets that need to be reviewed from a finance perspective and retired or disposed from a financial and physical perspective. This financial list is sent through workflow to the finance organization in aggregate, and a finance manager either approves or denies the retirements in total, in groups, or on an individual basis. For example, the asset manager may have eight servers that need to be retired with a total Cost of $124,000. In a one-click embodiment the asset manager can save the assets to a financial list, such as may be titled 'Missing Servers,' and can route the list to finance. Finance can retrieve the list and can approve all, some, or none of the transactions, and may ask for additional research to be done in situations where the impact is material. For example, the finance manager may decide to retire the oldest assets without requiring further investigation because the impact is immaterial. However, the two newest assets in the list may result in a material impact should the assets be written-off the books. Therefore, the finance manager may require the asset manager to perform further investigation to ensure that the asset is unable to be located before proceeding with the write-off. As discussed above, a system in accordance with one embodiment can provide Net Book Value and Fair Market Value information in addition to Cost information.

The use of workflow routing in one embodiment also provides for an ad hoc email message, SMS, or other appropriate notification to be generated that contains information such as the financial list title and any appropriate message, as well as a link to review the list. The message can be generated for an individual or sent to all the role users to whom financial transactions would ordinarily be routed.

In one embodiment, an additional inquiry is provided for the financial manager that is accessible from the message or via traditional navigation. The inquiry provides the list detail in an easy-to-read display, as well as links to individually retire the assets. Such a feature presents the financial manager with a single, easily accessible location to review the aggregate financial information, retire individual assets, and/or to route the entire list into the retirement workflow. A user viewing the information may not have the ability to retire an asset, as they can be a hierarchical or role-based structure as to who can retire certain assets.

The financial list can assist an asset manager in understanding which exceptions should be investigated and resolved immediately. For example, if there is an asset not in the discovery system that has a remaining net book value of $250,000, the asset manager will likely follow up on that exception over others that are less expensive. A financial list also will assist a finance asset manager in prioritizing their workload. As an example, fifty assets may be submitted to the finance manager for retirement, where the remaining net book value for the majority of the assets is zero. However, the remaining net book value for two of those assets is $50,000 each. Because retiring these two assets will have an expense impact from the retirement due to the write-off of the remaining net book value, it is highly likely that the finance manager will want to retire those two assets first, to ensure that the financial impact is captured before finance closes its ledger for the period. Other assets may be left to be retired in the future since there is no financial impact associated with the retirement.

The financial list also can be used as a barometer to assess which items may require further research. Using the retirement example above, the finance manager may decide to do a mass write-off or retirement for those assets that have no remaining net book value. However, because two assets have a material impact to the financials, the finance manager may request that the asset manager perform additional research on those assets to ensure that retirement is really in order, or to determine if there is an alternative to retirement. The asset manager may do additional research on the two assets in question and determine that those assets are able to be repaired at a nominal cost, and are therefore not damaged beyond repair. The assets then can be removed from the finance worklist and repair work can begin on the assets.

Such a system also can display enhanced metrics that display not only basic discrepancy information but that also include the financial impact of all the un-reconciled capitalized assets that potentially face retirement. Such a metric can be presented in a 'CFO Portal,' for example, where the CFO would immediately be made aware of the total impact that all missing assets have on the books.

For each physical asset to be retired, there must be a reason for retirement, e.g., the asset was lost or stolen. There also is financial book information as to which assets would need to be retired, and some financial calculations that would need to be reviewed. When an asset is finally retired, due to being missing, broken, old, etc., the asset is removed from physical use. A record of the retired asset will still reside on the financial books as a zero cost asset, however, such that there is still a record of the asset and thus an audit trail.

An exception-based interface is used in one embodiment to retire these assets. In such an interface, a stakeholder, in this case finance, can be presented with a tailored view of these assets. Thus instead of the assets being blindly routed to finance, an IT manager can view the exceptions and route the exceptions to finance with aggregate financial impact information and a tool whereby the finance employee can route an exception to another user, retire the asset corresponding to the exception, or remove the asset from the exception list and attempt to locate or reconcile the physical asset. This provides another layer of functionality to help departments and users such as finance.

Such a tool can apply not only in a managed exceptions situation, but also in the case where an asset is not reporting. In the "assets not reporting" situation, a set of high level metrics can be used that do more than simply call attention to each of the non-reporting assets. For managed exceptions, a problem with two assets may be contained in the managed exceptions indicating that one of the assets was located and the other was not. The tool then can associate an aggregate with those assets, such that the high level metric applies to both managed exceptions. Another metric for "assets not reporting" deals with assets that were found at one point but now cannot be located.

Figure 2:
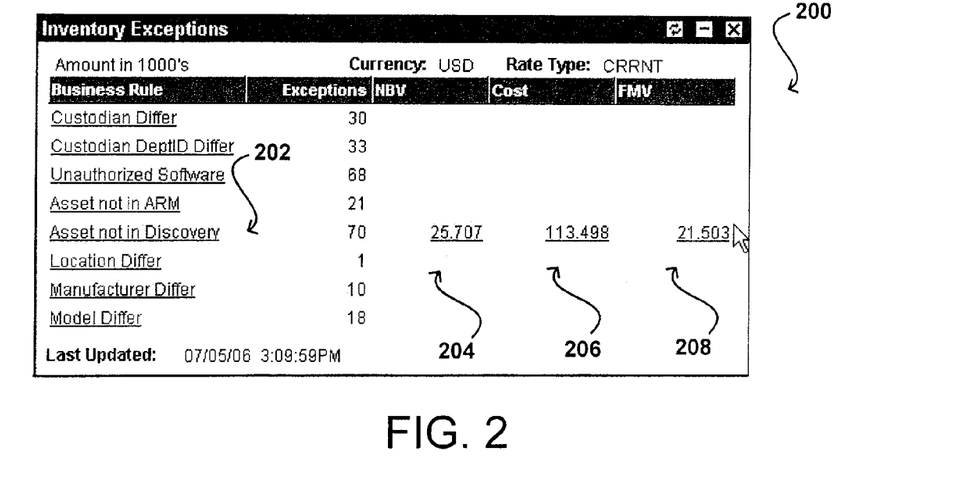
FIG. 2 illustrates an exemplary interface that can be used to display asset exceptions in accordance with one embodiment of the present invention.

In one embodiment, a displayed list of exceptions breaks down the exceptions by type of exception, for example, such as "Asset not in Discovery." The list can include a number of assets, and there can be financial information associated therewith such as a Net Book Value (NBV) column 204, a Cost column 206, and a Fair Market Value (FMV) column 208 as shown for the Asset Not in Discovery row 202 of an exemplary Inventory Exceptions interface page 200. Thus, at a high or enterprise level, a user can view the information and know that there are 70 assets that are not located in the discovery system, and can also know the aggregate cost of those assets. In some instances 70 might be a manageable number, but when the discrepancies get above that manageable number another business process might kick in. Driving things from a high aggregate level then might produce different results than working on the individual detail of those assets. Prior to this feature a user would have had to go into the information for each asset, retrieve the cost information, sum the information, and manually produce an aggregate number. This system instead provides the user with multiple types of aggregate information alongside the number and type of exception, which provides for quick and easy management on the part of a financial or other appropriate user. A user such as a CFO will greatly appreciate such a view without the need to obtain exception information, run the appropriate queries to obtain information, build a spreadsheet, etc.

Figure 3:
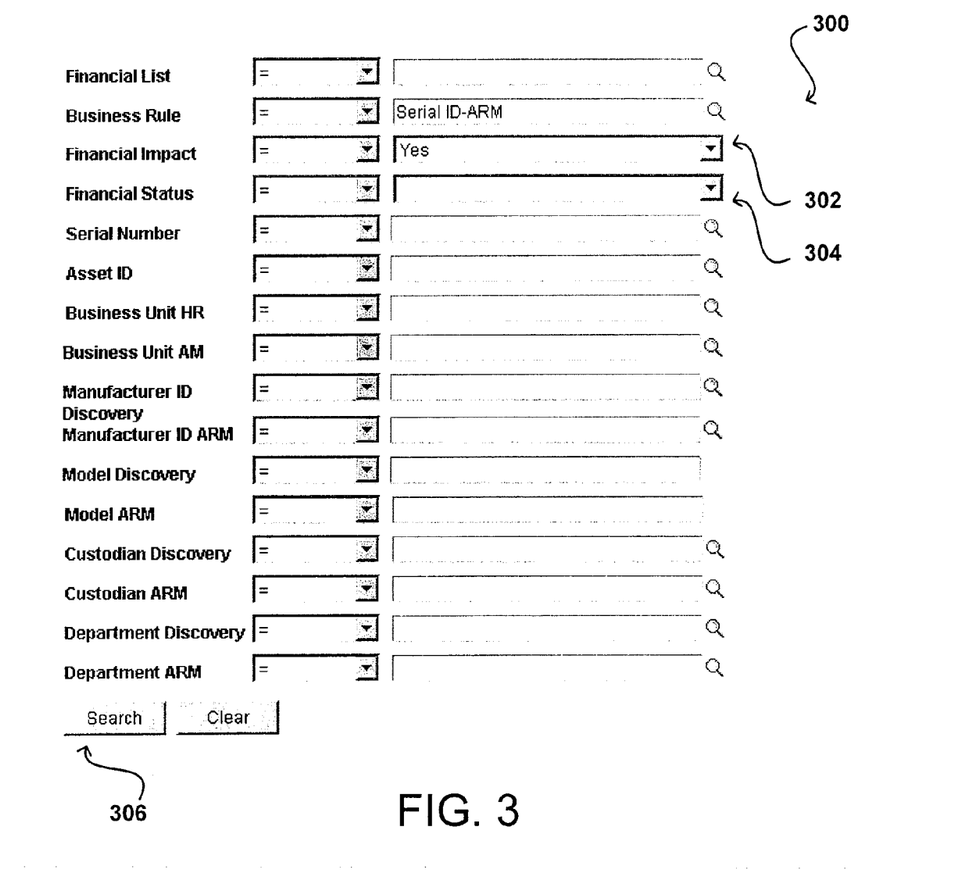
FIG. 3 illustrates an exemplary interface that can be used to search for exceptions using additional parameters in accordance with one embodiment of the present invention.
Figure 4:
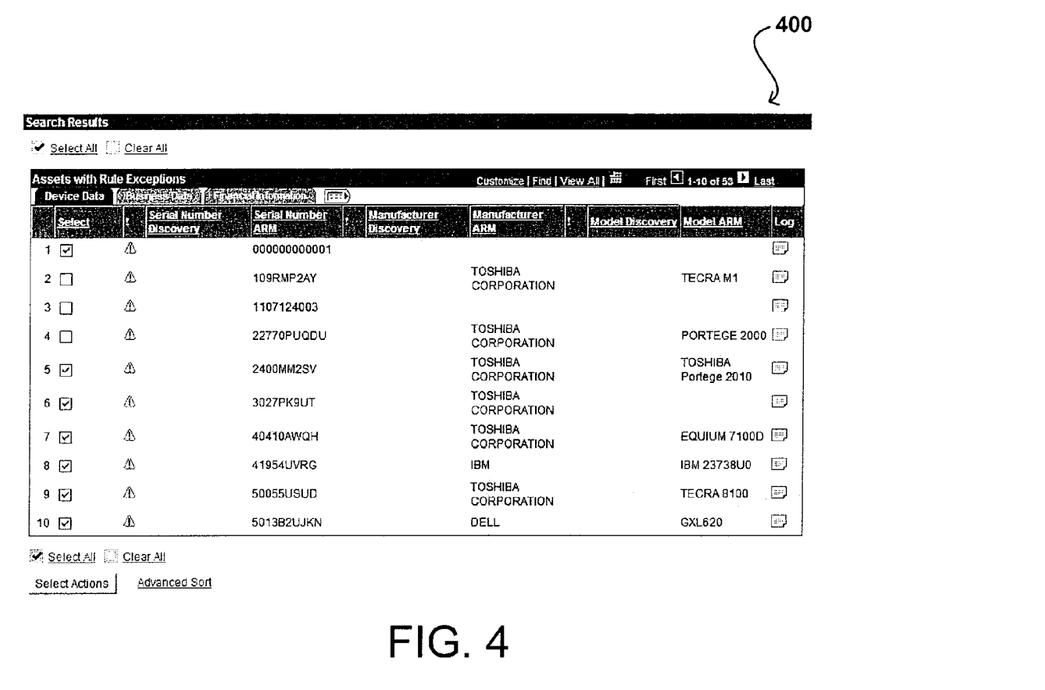
FIG. 4 illustrates an exemplary interface that can be used to view individual asset information in accordance with one embodiment of the present invention.
Figure 5:
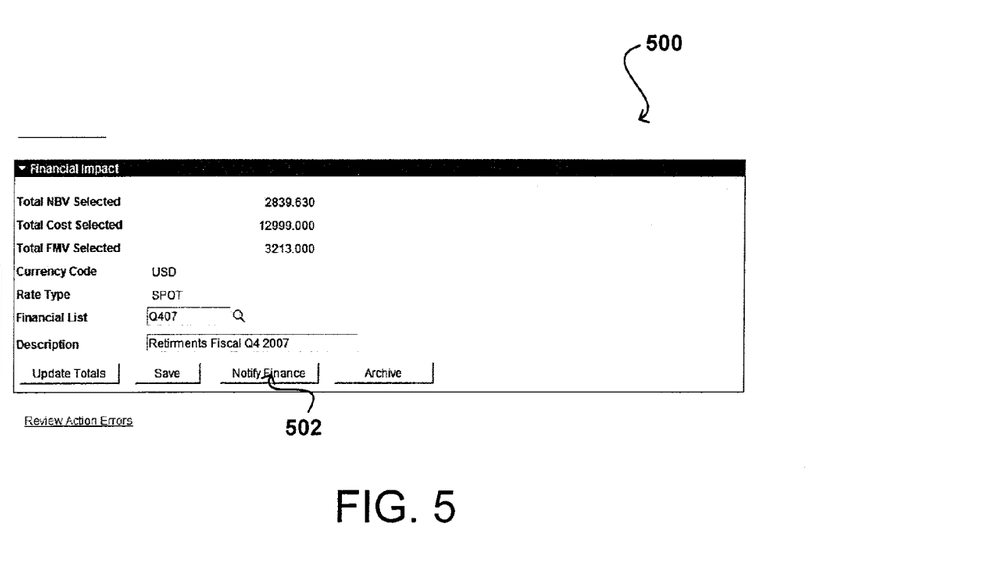
FIG. 5 illustrates an exemplary interface that can be used to display aggregate financial impact information in accordance with one embodiment of the present invention.

When an asset manager views the exceptions list, the manager can have the option of selecting an item, such as a hyperlink associated with the cost information, in order to view information about the exceptions. An application page 300 can be displayed, such as is shown in FIG. 3, which can include various additional parameters that can be selected to search through the exceptions. By selecting one of the links from the previous page, the relevant information can be pre-populated in this page, such as an option 302 specifying the appropriate business rule and an option 304 indicating that only assets with a financial impact should be returned in the result set. Once any additional parameters are set, a search option can be selected that searches the existing managed exceptions results with the addition of the financial impact option and any additional option selected by the user. A search results page portion 400 will be displayed, such as is shown in FIG. 4. This page shows a list of assets matching the query, along with any discovery information for the assets displayed. From this page, a user is able to select specific assets from the list, such as by selecting check boxes associated with the assets, and then selecting a "save" or similar option, such as is displayed in the financial impact page portion 500 of FIG. 5, which shows the financial impact of the selected assets. From here the user can have several options, such as by generating a list to be sent to finance. The list also can be save for future use, such as to route to a department, do further investigation, or any other appropriate use.

Figure 6:
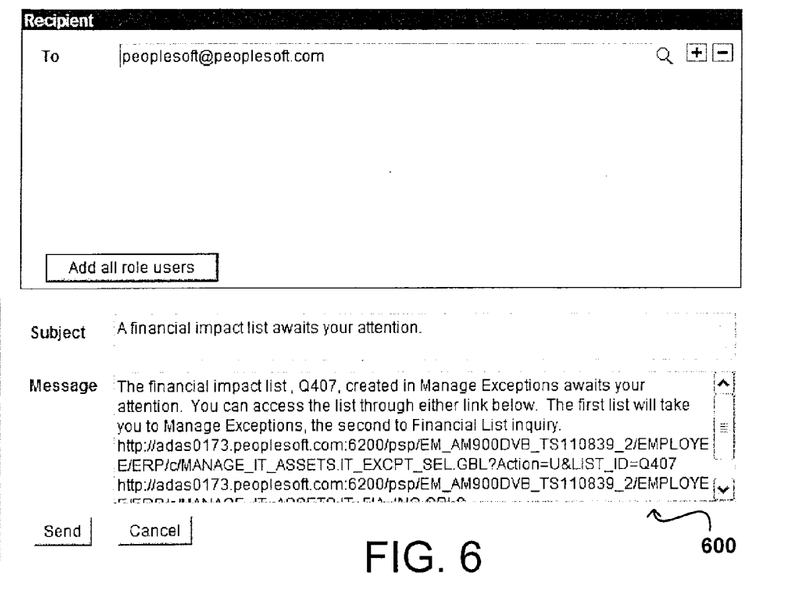
FIG. 6 illustrates an exemplary interface that can be used to email a list of exceptions and financial impact information to another user in accordance with one embodiment of the present invention.
Figure 7:
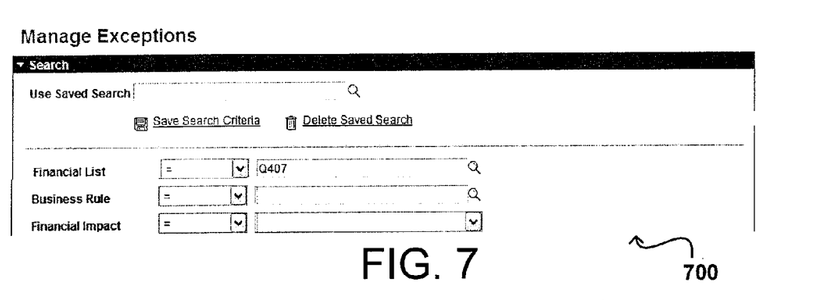
FIG. 7 illustrates an exemplary interface that can be used to manage a financial list of exceptions in accordance with one embodiment of the present invention.
Figure 8:
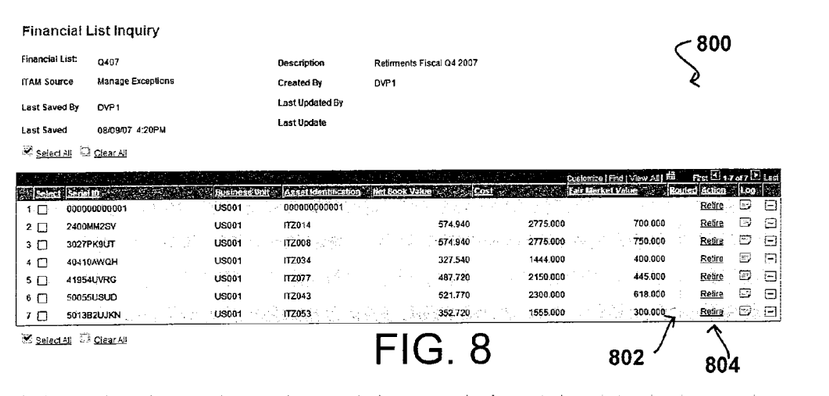
FIG. 8 illustrates an exemplary interface that can be used to choose to retire, route, or save asset information in accordance with one embodiment of the present invention.

If the user selects an option such as a "notify finance" option 502, a message screen 600 can be displayed, as illustrated in FIG. 6, which has a default message recipient and allows the user to add role users or other appropriate users. The message also can have default but editable subject and body text, which can include a link or URL to the list created and saved by the user. A recipient then can click on a first link to access a manage exceptions page portion 700 such as is illustrated in FIG. 7, which can be part of a the same application page as the portions of FIGS. 3, 4, and/or 5. In the manage exceptions page, the default value for the list is displayed, and the recipient, such as a finance manager, can have the ability to add options to filter the list to only display assets relevant to that recipient. If the finance manager selects a second link, a financial list inquiry page 800 can be displayed as illustrated in FIG. 8. From the financial list inquiry, the finance manager can view identification information for each of the assets of the list, along with financial impact information such as the NBV, Cost, and FMV values. The finance manager then has the option to select an object 802 for routing, or retire 804 each asset by selecting the appropriate asset from the list.

Figure 9:
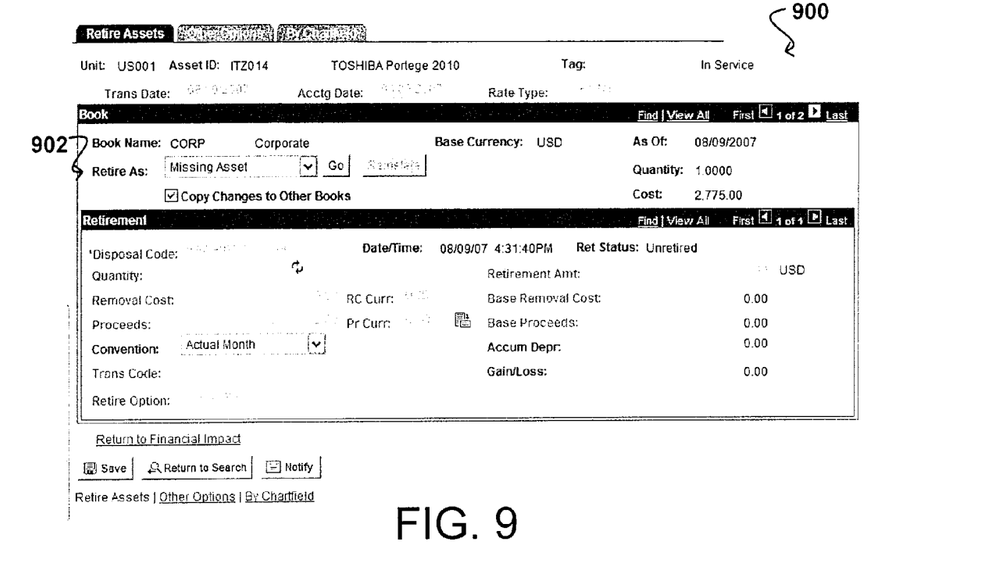
FIG. 9 illustrates an exemplary interface that can be used to retire assets in accordance with one embodiment of the present invention.
Figure 10:
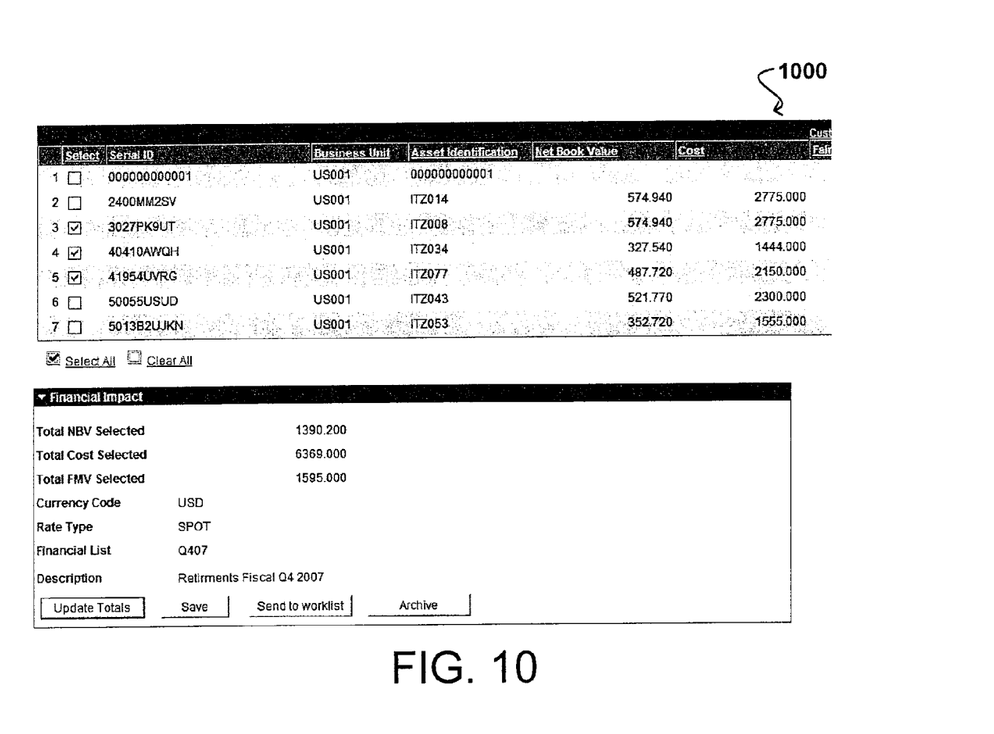
FIG. 10 illustrates an exemplary interface that can be used to choose to retire, route, or save remaining asset information in accordance with one embodiment of the present invention.

Each time the finance manager selects an option to retire an asset, the finance manager can receive a retire assets page 900 such as is illustrated in FIG. 9. From this page, the finance manager can select an option 902 to designate why an asset is being retired, such as because the asset is missing or the asset is no longer functional. There can be various other information entered in such a page to be stored along with the information for the retired asset. After retiring the appropriate assets, the finance manager can view the list 1000 of remaining asset exceptions, such as is illustrated in FIG. 10, which includes an updated list and can be part of the same application page as that displayed in FIG. 8, and can see the financial impact of these remaining assets. From here, the finance manager can choose to save the list of remaining assets and/or route at least some of the remaining assets to another user based at least in part on the financial impact information.

Figure 11:
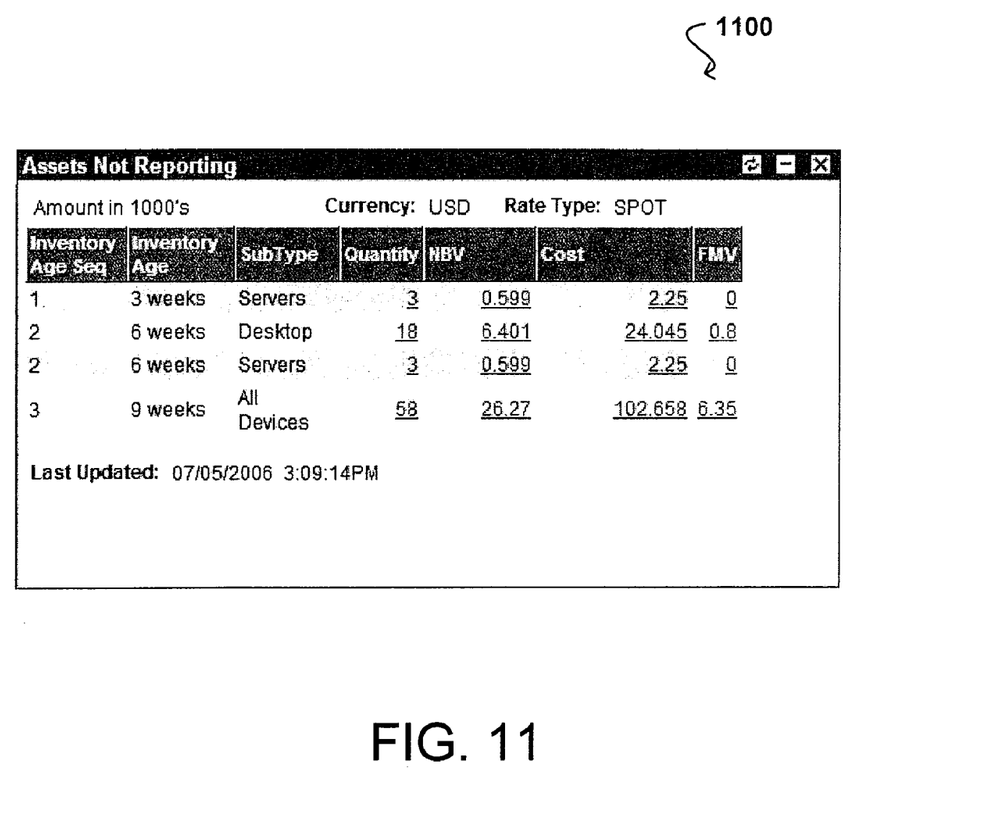
FIG. 11 illustrates an exemplary interface that can be used to display information for assets not reporting in accordance with one embodiment of the present invention.

FIG. 11 illustrates an exemplary page 1100 that can be displayed to a user if the user instead selects an "assets not reporting" option from the user's portal. From here, the pages can proceed such as is described above with the "asset not in discovery" flow.

Figure 12:
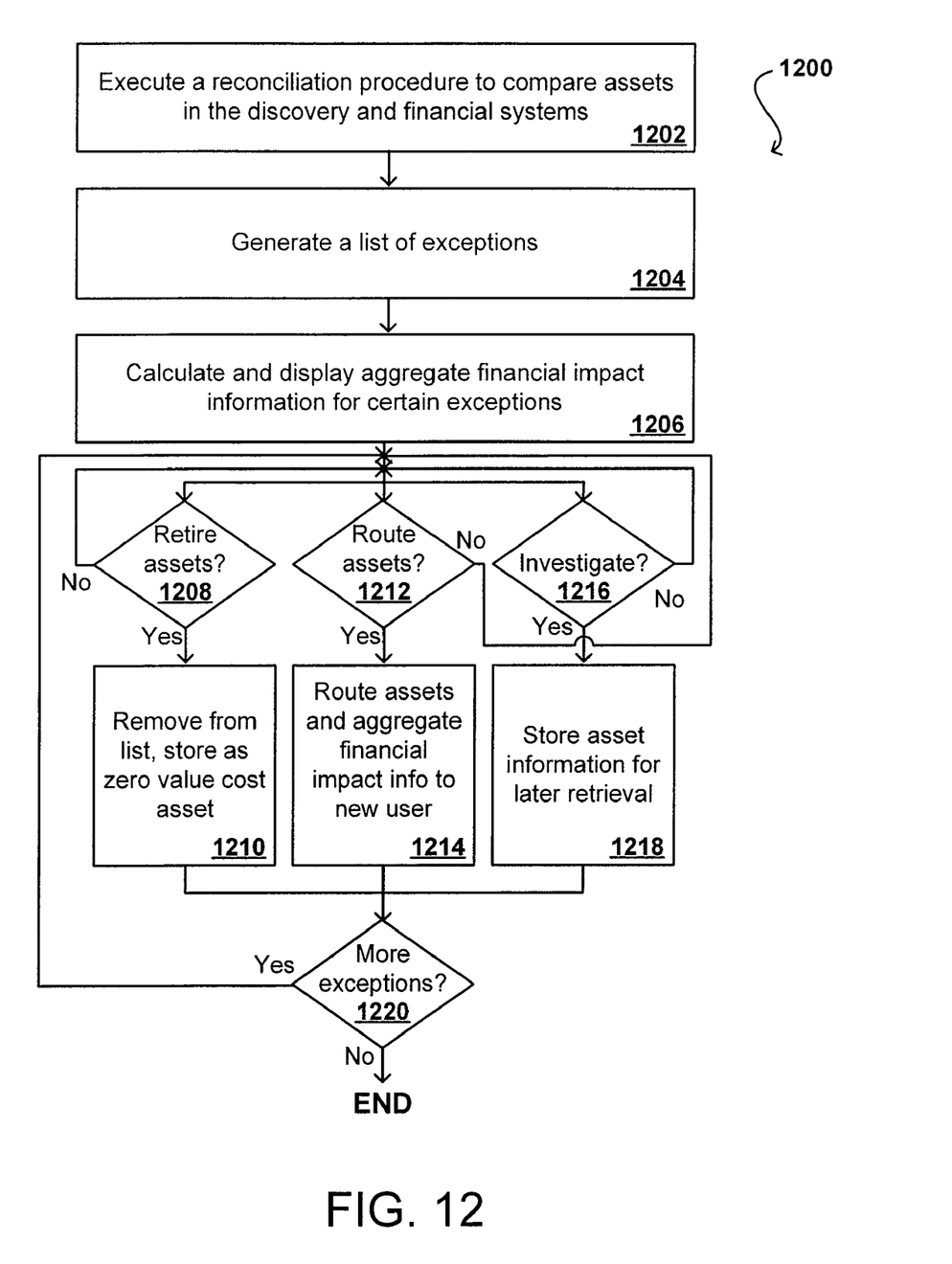
FIG. 12 illustrates steps of an exemplary process that can be used in accordance with one embodiment of the present invention.

FIG. 12 illustrates steps of a process 1200 for retiring or routing asset exceptions in accordance with one embodiment, which can utilize at least some of the pages and functionality described above. In the process, a reconciliation procedure is done to compare the physical asset information in the discovery system with financial asset information in a corresponding financial system 1202. A list of exceptions is generated where information for assets in the discovery system does not match information for assets in the financial system 1204. For assets that are located in the financial system but not in the discovery system, aggregate financial information is calculated and displayed next to the relevant exception information 1206. The financial information can include information such as cost, fair market value, and net market value, and can be calculated using any appropriate approach known or used in the art for calculating such values. If the user viewing the list of exceptions decides to retire at least some of the assets 1208, those assets are removed from the list of exceptions and stored as a zero cost asset in the financial system 1210. If the user viewing the list of exceptions decides to route at least some of the assets 1212, then the user can group the assets and route the assets and aggregate financial information for the grouped assets to another user 1214. If the user viewing the list of exceptions decides to investigate at least some of the assets 1216, then the user can save the list and return after the investigation 1218. If there are more exceptions in the list 1220, then the user can make further decisions regarding the list.

Another advantage to providing instant access to forecasting and aggregate information is that it can easily be determined whether there needs to be some reconciliation or other work done for Sarbanes-Oxley and audit purposes at the end of a quarter or fiscal year, for example. If there are discrepancies on the books and the net book values are material, and there are a number of assets recorded on the books that you know longer own and operate, then there can be resulting financial and audit implications that are important to know before the books are closed for that period. The ability to instantly view aggregate information will further enhance an enterprise's ability to be compliant. Even if those assets cannot be tracked, or if the enterprise wishes to further investigate those assets prior to retiring them, the enterprise can at least know the potential exposure, which is a key piece of financial information. It also is advantageous to know the amount of exposure instead of simply knowing that there are some assets lost across the organization but without any insight into the aggregate of all those missing assets.

In addition to advantages for quarter-end or year-end reporting, a finance department typically is mandated to report any material adjustments to their financial statements or forecasts in a timely manner. If the asset(s) to be written-off amounts to a material expense, finance may need to take immediate action to adjust their financial forecasts and notify the CFO of a material book to physical difference that may impact their quarterly results. Sarbanes-Oxley mandates that material information that could impact external results be disclosed in a timely fashion, and systems in accordance with the various embodiments can provide tools to ensure compliance with this mandate.

Having the financial asset list associated with finance actions such as asset retirement will assist the finance user in determining whether it is necessary to modify internal forecasts. Using the asset retirement example above with two assets that will impact the books upon retirement, assuming the finance manager proceeds with retiring these assets the system will immediately inform the manager that the associated impact of the retirement will be a $50,000 hit to expense for the period. Assuming that this retirement was not in the financial forecast, the finance manager can now adjust the forecast accordingly to ensure the $50,000 expense is included.

In one embodiment a user viewing an enterprise view of assets across the organization is able to drill into the high level aggregate. A user can be provided with a search or select capability that allows the user to narrow the view by department, business unit, individual owner, or any other appropriate entity. For many situations, it will be sufficient from an investigative perspective to know when a particular department is over an allowable threshold such that a department manager can be notified to address the exceptions, for example. The tool also can allow a CFO or finance employee, for example, to generate lists of assets by department, business unit, geography, etc. The lists can include the aggregate information and can be routed to the responsible party.

Such a system can increase the efficiency of the financial manager as well as provide relevant information at the point when it is most needed. The financial managers will have a clear view of the impact of retiring or disposing of assets, and will have aggregate financial totals to assist them in the decision making process as well as for financial forecasts. Asset managers can have a tool to better group assets and inform finance of pending transactions via a built-in email tool. The highest-level metrics can present a complete look at the total financial impact if all assets were to be retired.

Figure 13:
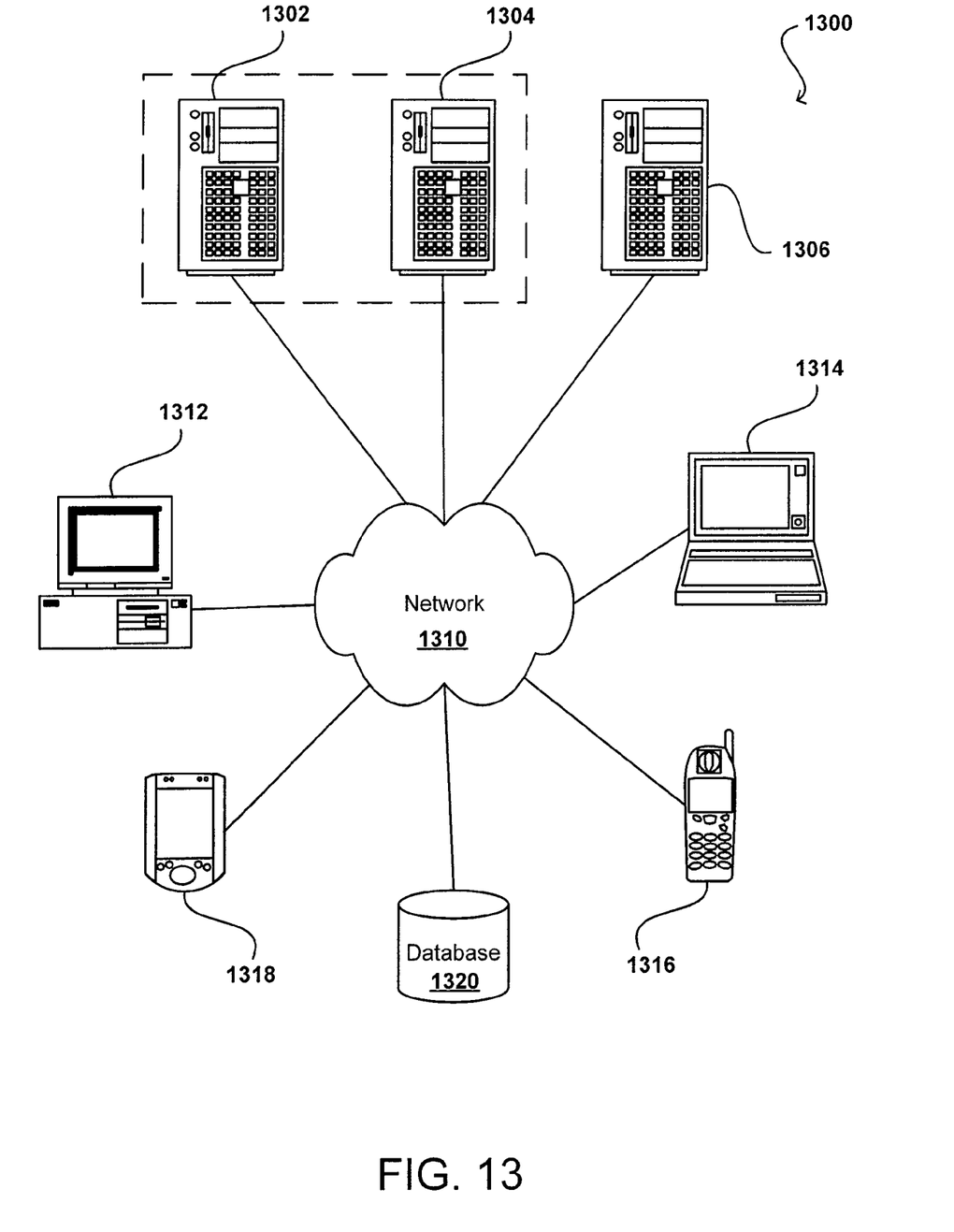
FIG. 13 illustrates components of an exemplary operating environment that can be used in accordance with various embodiments of the present invention.

FIG. 13 is a block diagram illustrating components of an exemplary operating environment in which various embodiments of the present invention may be implemented. The system 1300 can include one or more user computers, computing devices, or processing devices 1312, 1314, 1316, 1318, which can be used to operate a client, such as a dedicated application, web browser, etc. The user computers 1312, 1314, 1316, 1318 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1312, 1314, 1316, 1318 may also have any of a variety of applications, including one or more development systems, database client and/or server applications, and Web browser applications. Alternatively, the user computers 1312, 1314, 1316, 1318 may be any other electronic device, such as a thin-client computer, Internet-enabled gaming system, and/or personal messaging device, capable of communicating via a network (e.g., the network 1310 described below) and/or displaying and navigating Web pages or other types of electronic documents. Although the exemplary system 1300 is shown with four user computers, any number of user computers may be supported.

In most embodiments, the system 1300 includes some type of network 1310. The network may be any type of network familiar to those skilled in the art that can support data communications using any of a variety of commercially-available protocols, including without limitation TCP/IP, SNA, IPX, AppleTalk, and the like. Merely by way of example, the network 1310 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1302, 1304, 1306 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1306) may be dedicated to running applications, such as a business application, a Web server, application server, etc. Such servers may be used to process requests from user computers 1312, 1314, 1316, 1318. The applications can also include any number of applications for controlling access to resources of the servers 1302, 1304, 1306.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1312, 1314, 1316, 1318. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1312, 1314, 1316, 1318.

The system 1300 may also include one or more databases 1320. The database(s) 1320 may reside in a variety of locations. By way of example, a database 1320 may reside on a storage medium local to (and/or resident in) one or more of the computers 1302, 1304, 1306, 1312, 1314, 1316, 1318. Alternatively, it may be remote from any or all of the computers 1302, 1304, 1306, 1312, 1314, 1316, 1318, and/or in communication (e.g., via the network 1310) with one or more of these. In a particular set of embodiments, the database 1320 may reside in a storage-area network ("SAN") familiar to those skilled in the art. Similarly, any necessary files for performing the functions attributed to the computers 1302, 1304, 1306, 1312, 1314, 1316, 1318 may be stored locally on the respective computer and/or remotely, as appropriate. In one set of embodiments, the database 1320 may be a relational database, such as Oracle 10g, that is adapted to store, update, and retrieve data in response to SQL-formatted commands.

Figure 14:
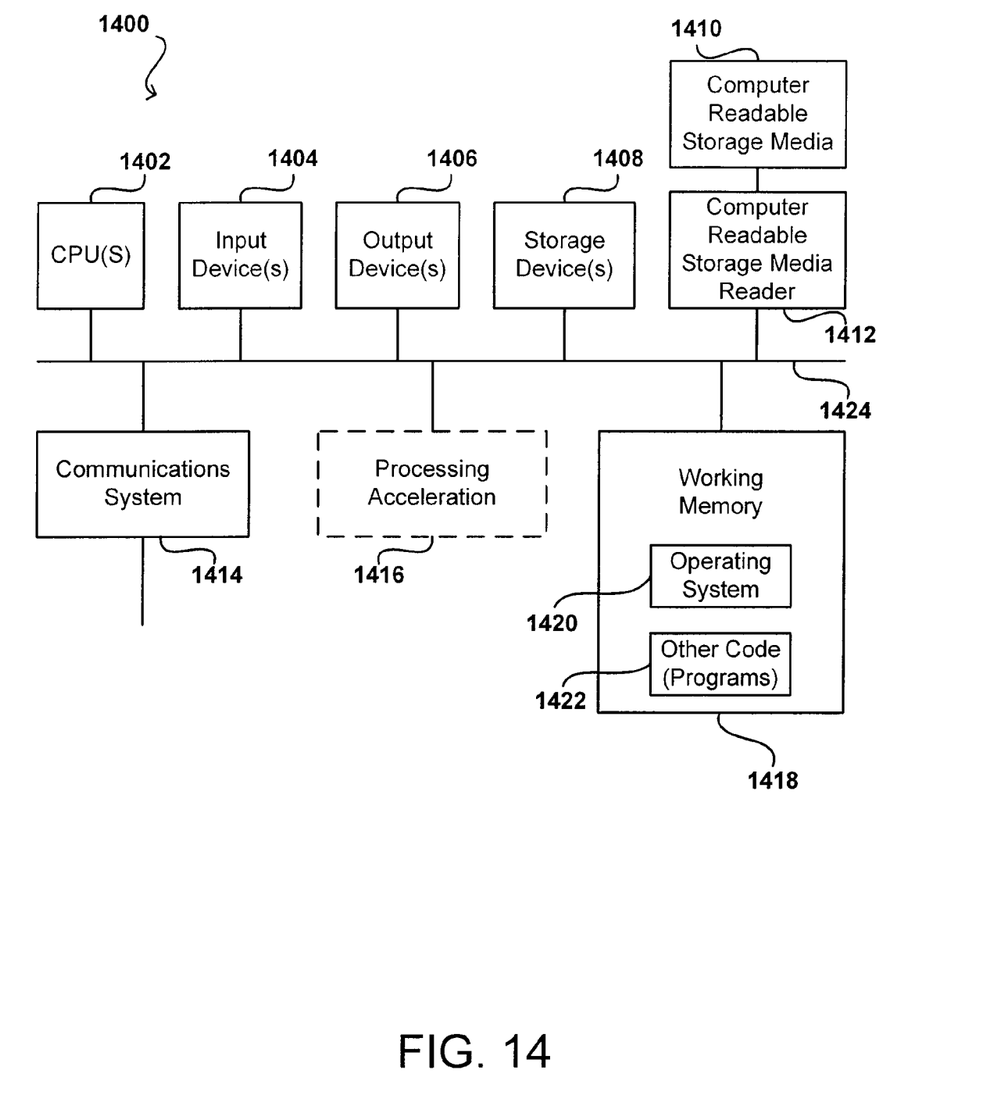
FIG. 14 illustrates components of an exemplary computer system that can be used in accordance with various embodiments of the present invention.

FIG. 14 illustrates an exemplary computer system 1400, in which various embodiments of the present invention may be implemented. The system 1400 may be used to implement any of the computer systems described above. The computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). The computer system 1400 may also include one or more storage devices 1408. By way of example, the storage device(s) 1408 can include devices such as disk drives, optical storage devices, solid-state storage device such as a random access memory ("RAM") and/or a read-only memory ("ROM"), which can be programmable, flash-updateable and/or the like.

The computer system 1400 may additionally include a computer-readable storage media reader 1412, a communications system 1414 (e.g., a modem, a network card (wireless or wired), an infra-red communication device, etc.), and working memory 1418, which may include RAM and ROM devices as described above. In some embodiments, the computer system 1400 may also include a processing acceleration unit 1416, which can include a digital signal processor DSP, a special-purpose processor, and/or the like.

The computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing, storing, transmitting, and retrieving computer-readable information. The communications system 1414 may permit data to be exchanged with the network and/or any other computer described above with respect to the system 1400.

The computer system 1400 may also comprise software elements, shown as being currently located within a working memory 1418, including an operating system 1420 and/or other code 1422, such as an application program (which may be a client application, Web browser, mid-tier application, RDBMS, etc.). It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of presenting aggregate financial impact information for handling asset discrepancies, the method comprising:

receiving, at one or more computer systems, a plurality of asset exceptions generated in response to identifying assets represented in a financial system that do not have corresponding physical asset information in an asset discovery system, each asset exception corresponding to financial asset information for an asset represented in the financial system identified as not have corresponding physical asset information for the asset in the asset discovery system;

determining, with one or more processors associated with the one or more computer systems, an aggregate financial impact for all asset exceptions of a first type based on the corresponding financial asset information for each asset of the first type, the aggregate financial impact indicating a financial impact of retiring all asset exceptions of the first type in the financial system;

generating, with the one or more processors associated with the one or more computer systems, information configured for displaying the aggregate financial impact for all asset exceptions of the first type together with first functionality enabling a first user of the one or more computer systems to perform at least one of routing the asset exceptions of the first type to a second user of the one or more computer systems and storing the plurality of asset exceptions in a storage device associated with the one or more computer systems for later retrieval after investigating a status of the asset; and in response to input provided by the first user via the first functionality, routing the asset exceptions of the first type to a second user of the one or more computer systems with the one or more processors associated with the one or more computer systems or storing the plurality of asset exceptions in a storage device associated with the one or more computer systems for later retrieval after investigating a status of the asset.

2. A method according to claim 1, further comprising:
generating information configured for displaying the aggregate financial impact together with second functionality allowing the first user to partition the asset exceptions of a first type into groups; and
determining a group aggregate financial impact for all asset exceptions of each group.

3. A method according to claim 2, further comprising:
generating information configured for displaying the group aggregate financial impact for all asset exceptions of each group together with third functionality allowing the first user to perform at least one of retiring the group, routing the group to the second user, and storing the group for later retrieval after investigating a status of the assets of that group.

4. A method according to claim 1, further comprising:
in response to input provided by the second user, retiring the asset exceptions of the first type, routing the asset exceptions of the first type to a third user, or storing the plurality of asset exceptions for later retrieval after investigating a status of the asset.

5. A method according to claim 1, further comprising:
determining an aggregate financial impact for all asset exceptions of a second type based on corresponding financial asset information for each asset of the second type;
generating information configured for displaying the aggregate financial impact for all asset exceptions of the first type together with second functionality enabling the first user of the one or more computer systems to perform routing the asset exceptions of the first type to the second user of the one or more computer systems; and
in response to input provided by the first user via the second functionality, routing the asset exceptions of the second type to the second user of the one or more computer systems.

6. A method according to claim 1, wherein:
determining the aggregate financial impact for all asset exceptions of a first type based on the corresponding financial asset information for each asset of the first type includes determining at least one of cost information, fair market value information, and net book value information.

7. A method according to claim 1, further comprising:
receiving physical asset information in response to an asset discovery process that determines the presence of physical assets connected to a network; and
storing the physical asset information in the asset discovery system.

8. A method according to claim 1, wherein:
generating the information configured for displaying the aggregate financial impact for all asset exceptions of the first type together with first functionality comprises generating information that enables the first user to view each asset exception separately, including financial impact information for the asset associated with the asset exception.

9. A method according to claim 1, wherein:
the first user is associated with a role as an asset manager and the second user is associated with a role as a finance manager.

10. A method according to claim 1, further comprising:
sending a message to the second user in response to routing the asset exceptions of the first type to the second user, the message including a link to access a display of the asset exceptions of the first type.

11. A method according to claim 1, wherein:
the asset exceptions of the first type visible to the first user depend on a role of the first user.

12. A method according to claim 1, further comprising:
removing an asset from the plurality of asset exceptions if the financial asset information and physical asset information for that asset are reconciled.

13. A system for presenting aggregate financial impact information for handling asset discrepancies, the system comprising:
a processor; and
a memory configured to store instructions which, when executed by the processor, cause the processor to:
receive a plurality of asset exceptions generated in response to identifying assets represented in a financial system that do not have corresponding physical asset information in an asset discovery system, each asset exception corresponding to financial asset information for an asset represented in the financial system identified as not have corresponding physical asset information for the asset in the asset discovery system;
determine an aggregate financial impact for all asset exceptions of a first type based on the corresponding financial asset information for each asset of the first type, the aggregate financial impact indicating a financial impact of retiring all asset exceptions of the first type in the financial system;
generate information configured for displaying the aggregate financial impact for all asset exceptions of the first type together with first functionality enabling a first user to perform at least one of routing the asset exceptions of the first type to a second user and storing the plurality of asset exceptions for later retrieval after investigating a status of the asset; and
in response to input provided by the first user via the first functionality, routing the asset exceptions of the first type to a second user or storing the plurality of asset exceptions for later retrieval after investigating a status of the asset.

14. A system according to claim 13, further including instructions which, when executed by the processor, cause the processor to:
generate information configured for displaying the aggregate financial impact together with second functionality allowing the first user to partition the asset exceptions of a first type into groups; and
determine a group aggregate financial impact for all asset exceptions of each group.

15. A system according to claim 14, further including instructions which, when executed by the processor, cause the processor to:

generate information configured for displaying the group aggregate financial impact for all asset exceptions of each group together with third functionality allowing the first user to perform at least one of retiring the group, routing the group to the second user, and storing the group for later retrieval after investigating a status of the assets of that group.

16. A system according to claim 13, further including instructions which, when executed by the processor, cause the processor to:
determine an aggregate financial impact for all asset exceptions of a second type based on corresponding financial asset information for each asset of the second type;
generate information configured for displaying the aggregate financial impact for all asset exceptions of the first type together with second functionality enabling the first user to perform routing the asset exceptions of the first type to the second user; and
in response to input provided by the first user via the second functionality, route the asset exceptions of the second type to the second user.

17. A system according to claim 13, further including instructions which, when executed by the processor, cause the processor to:
in response to input provided by the second user, retiring the asset exceptions of the first type, routing the asset exceptions of the first type to a third user, or storing the plurality of asset exceptions for later retrieval after investigating a status of the asset.

18. A system according to claim 13, further including instructions which, when executed by the processor, cause the processor to:
determine the aggregate financial impact for all asset exceptions of a first type based on the corresponding financial asset information for each asset of the first type includes determining at least one of cost information, fair market value information, and net book value information.

19. A system according to claim 13, further including instructions which, when executed by the processor, cause the processor to:
generate the information configured for displaying the aggregate financial impact for all asset exceptions of the first type together with first functionality comprises generating information that enables the first user to view each asset exception separately, including financial impact information for the asset associated with the asset exception.

20. A system according to claim 13, wherein:
the first user is associated with a role as an asset manager and the second user is associated with a role as a finance manager.

21. A system according to claim 13, further including instructions which, when executed by the processor, cause the processor to:
send a message to the second user in response to routing the asset exceptions of the first type to the second user, the message including a link to access a display of the asset exceptions of the first type.

22. A system according to claim 13, further including instructions which, when executed by the processor, cause the processor to:
remove an asset from the plurality of asset exceptions if the financial asset information and physical asset information for that asset are reconciled.

23. A non-transitory computer readable medium storing program code for presenting aggregate financial impact information for handling asset discrepancies, the computer-readable medium comprising:
program code receiving a plurality of asset exceptions generated in response to identifying assets represented in a financial system that do not have corresponding physical asset information in an asset discovery system, each asset exception corresponding to financial asset information for an asset represented in the financial system identified as not have corresponding physical asset information for the asset in the asset discovery system;
program code for determining an aggregate financial impact for all asset exceptions of a first type based on the corresponding financial asset information for each asset of the first type, the aggregate financial impact indicating a financial impact of retiring all asset exceptions of the first type in the financial system;
program code for generating information configured for displaying the aggregate financial impact for all asset exceptions of the first type together with first functionality enabling a first user of the one or more computer systems to perform at least one of routing the asset exceptions of the first type to a second user of the one or more computer systems and storing the plurality of asset exceptions in a storage device associated with the one or more computer systems for later retrieval after investigating a status of the asset; and
program code for, in response to input provided by the first user via the first functionality, routing the asset exceptions of the first type to a second user of the one or more computer systems with the one or more processors associated with the one or more computer systems or storing the plurality of asset exceptions in a storage device associated with the one or more computer systems for later retrieval after investigating a status of the asset.

24. A computer-readable medium according to claim 23, further comprising:
program code for allowing the first user to partition the asset exceptions of a first type into groups; and
program code for determining a group aggregate financial impact information for all asset exceptions of each group.

25. A computer-readable medium according to claim 24, further comprising:
program code for allowing the first user to perform at least one of retiring the group, routing the group to a second user, and storing the group for later retrieval after investigating a status of the assets of that group, based on the group aggregate financial impact information for each group of asset exceptions.

26. A computer-readable medium according to claim 23, further comprising:
program code for determining an aggregate financial impact for all asset exceptions of a second type based on corresponding financial asset information for each asset of the second type;
program code for enabling the first user of the one or more computer systems to perform routing the asset exceptions of the first type to the second user of the one or more computer systems; and
program code for, in response to input provided by the first user via the second functionality, routing the asset exceptions of the second type to the second user of the one or more computer system.

27. A computer-readable medium according to claim 23, further comprising:

program code for allowing the first user to view each asset exception separately, including financial impact information for that financial asset, in order to determine how to process each asset exception.

28. A computer-readable medium according to claim 23, further comprising:

program code for sending a message to the second user when the first user decides to route the asset exceptions, the message including a link to access a display of the asset exceptions.

29. A computer-readable medium according to claim 23, further comprising:

program code for removing an asset from the asset exception if the financial asset information and physical asset information for that asset are reconciled.

30. A computer-readable medium according to claim 23, further comprising:

program code for allowing the second user to perform at least one of retiring the asset exceptions of the first type, routing the asset exceptions of the first type to a third user, and storing the plurality of asset exceptions for later retrieval after investigating a status of the asset.

* * * * *

UNITED STATES PATENT AND TRADEMARK OFFICE
CERTIFICATE OF CORRECTION

| | | |
|---|---|---|
| PATENT NO. | : 7,945,490 B2 | |
| APPLICATION NO. | : 11/847723 | |
| DATED | : May 17, 2011 | |
| INVENTOR(S) | : Alonzo et al. | |

It is certified that error appears in the above-identified patent and that said Letters Patent is hereby corrected as shown below:

In column 8, line 15, after "of" delete "a".

In column 16, line 1, in Claim 23, delete "computer readable" and insert -- computer-readable --, therefor.

In column 16, line 67, in Claim 26, delete "system." and insert -- systems. --, therefor.

Signed and Sealed this
Eleventh Day of October, 2011

David J. Kappos
*Director of the United States Patent and Trademark Office*